United States Patent [19]
Sastry et al.

[11] Patent Number: 5,768,300
[45] Date of Patent: Jun. 16, 1998

[54] INTERCONNECT FAULT DETECTION AND LOCALIZATION METHOD AND APPARATUS

[75] Inventors: Raghu Sastry, Santa Clara; Jeffrey D. Larson, San Jose; Albert Mu, Milpitas; John R. Slice, Boulder Creek; Richard L. Schober, Jr., Cupertino; Thomas M. Wicki, Palo Alto, all of Calif.

[73] Assignee: Fujitsu Limited, Kawasaki, Japan

[21] Appl. No.: 603,911

[22] Filed: Feb. 22, 1996

[51] Int. Cl.$^6$ .............................. G06F 11/10; H03M 13/00
[52] U.S. Cl. ........................ 371/49; 371/20.1; 371/37.01
[58] Field of Search ............................. 371/49.1, 49.2, 371/48, 49.3, 37.01

[56] References Cited

U.S. PATENT DOCUMENTS

| | | | |
|---|---|---|---|
| 4,599,723 | 7/1986 | Eck | 371/47 |
| 5,068,854 | 11/1991 | Chandran et al. | 371/37.1 |
| 5,390,197 | 2/1995 | MacDonald et al. | 371/37.1 |
| 5,406,563 | 4/1995 | Loebig | 371/5.1 |

FOREIGN PATENT DOCUMENTS

| | | | |
|---|---|---|---|
| 0 486 915 A1 | 5/1992 | European Pat. Off. | H04L 12/26 |
| 0 520 580 A1 | 12/1992 | European Pat. Off. | H04L 1/00 |
| 2032 736 | 5/1980 | United Kingdom | H04L 1/08 |
| WO 91/07032 | 5/1991 | WIPO | H04L 1/22 |

OTHER PUBLICATIONS

Hideyo Murakami, Naoshi Sato and Tsukasa Okamoto; "Monitoring Method for Cell Transfer Performance in ATM Networks"; NTTReview; Jul. 1992; vol. 4; No. 4; pp. 38–44.

Primary Examiner—Phung M. Chung
Attorney, Agent, or Firm—Fenwick & West LLP

[57] ABSTRACT

A method and apparatus for detecting and isolating an interconnect fault in a packet switched network generates a parity check error code for status messages which are used for flow control in a packet switched network. The packet switched network uses a reverse flow control method wherein status messages are sent locally between adjacent nodes. A receiving node uses status messages to inform an adjacent node of the availability of the input buffers located in the receiving node. Included in the status message is a parity check code that is sent sequentially with the status message using two phases of a clock. The parity check code is a one bit parity check for each bit of the status message. Faults on the local interconnect are detected at the receiving node by performing a one bit parity check on the received status message using the accompanying parity code. Because the status message and the parity check code are transmitted over the same physical bit connections, the one bit parity checks detects any "stuck at" or "open" faults in the link.

10 Claims, 5 Drawing Sheets

INTERCONNECT FAULT DETECTION AND LOCALIZATION METHOD AND APPARATUS

CROSS-REFERENCES TO RELATED APPLICATIONS

The subject matter of this application is related to the subject matter of the following applications:

application Ser. No. 08/605,677, attorney docket number 2268, entitled "ASYNCHRONOUS PACKET SWITCHING" filed on Feb. 22, 1996, by Thomas M. Wicki, Patrick J. Helland, Takeshi Shimizu, Wolf-Dietrich Weber, and Winfried W. Wilcke;

application Ser. No. 08/605,676, attorney docket number 2269, entitled "SYSTEM AND METHOD FOR DYNAMIC NETWORK TOPOLOGY EXPLORATION" filed on Feb. 22, 1996, by Thomas M Wicki, Patrick J. Helland, Wolf-Dietrich Weber, and Winfried W. Wilcke;

application Ser. No. 08/603,926, attorney docket number 2270, entitled "LOW LATENCY, HIGH CLOCK FREQUENCY PLESIOASYNCHRONOUS PACKET-BASED CROSSBAR SWITCHING CHIP SYSTEM AND METHOD" filed on Feb. 22,1996, by Thomas M. Wicki, Jeffrey D. Larson, Albert Mu, and Raghu Sastry;

application Ser. No. 08/603,880, attorney docket number 2271, entitled "METHOD AND APPARATUS FOR COORDINATING ACCESS TO AN OUTPUT OF A ROUTING DEVICE IN A PACKET SWITCHING NETWORK" filed on Feb. 22, 1996, by Jeffrey D. Larson, Albert Mu, and Thomas M. Wicki;

application Ser. No. 08/604,920, attorney docket number 2272, entitled "CROSSBAR SWITCH AND METHOD WITH REDUCED VOLTAGE SWING AND NO INTERNAL BLOCKING DATA PATH" filed on Feb. 22, 1996, by Albert Mu and Jeffrey D. Larson;

application Ser. No. 08/603,913, attorney docket number 2274, entitled "A FLOW CONTROL PROTOCOL SYSTEM AND METHOD" filed on Feb. 22, 1996, by Thomas M. Wicki, Patrick J. Helland, Jeffrey D. Larson, Albert Mu, Raghu Sastry and Richard L. Schober, Jr.;

application Ser. No. 08/603,923, attorney docket number 2277, entitled, "METHOD AND APPARATUS FOR DETECTION OF ERRORS IN MULTIPLE-WORD COMMUNICATIONS" filed on Feb. 22, 1996, by Thomas M. Wicki, Patrick J. Helland and Takeshi Shimizu; and application Ser. No. 08/603,882, attorney docket number 2278, entitled "CLOCKED SENSE AMPLIFIER WITH POSITIVE SOURCE FEEDBACK" filed on Feb. 22, 1996, by Albert Mu;

all of the above applications are incorporated herein by reference in their entirety.

BACKGROUND OF THE INVENTION

1. Field of the Invention

This invention relates to fault detection in a packet switched network and more particularly to the detection and localization of interconnect faults in a packet switched network which uses a status message-based link control protocol.

2. Description of the Related Art

An efficient packet switched network requires dependable electrical connections between nodes in the network. Network errors (faults) can occur if the conductors (for example, a wire) physically linking the nodes in a network are in either a "stuck-at" or "open" state. A conductor is in a "stuck-at" state if the coupling link is erroneously pulled or pushed to a specific voltage level. Thus, the conductor is stuck at the pulled or pushed level regardless of the level of the signal applied to the physical link. An "open" state means that the link is not coupled to the signal but instead carries no signal and thus "floats" at an indeterminate voltage level. Both the "stuck-at" and "open" conditions in an electrical link cause fault conditions in a packet switched network. Fault detection and localization is important in assisting a network manager in network maintenance and during operation, fault detection and localization allows source nodes to re-route packets in order to avoid areas of a network having an unacceptable number of faults. Thus, fault detection and localization is important in maintaining a reliable packet switched network. One conventional method of fault detection uses error codes, such as a cyclic redundancy code (CRC), which is included with each packet sent over the packet switched network. In this conventional scheme, the node originating a packet generates an error detection code and appends the code to the packet for transmission. The receiving node (destination) then conventionally performs an error check on the received data packet to determine whether the packet suffered any transmission error. This fault detection scheme has the disadvantage of making error detection integral with the data transmission so that faults are detected only after data packets have been received at a destination node. This conventional scheme also has the added drawback that faults are merely detected and not isolated to a specific physical link. A conventional variation of this detection scheme performs a fault test on a packet at intermediate nodes in the network in order to isolate fault to a region within the network. This scheme, however, adds latency to the total transmission time of a packet and thus degrades network performance.

Another conventional fault detection scheme transmits a test packet from a test source along a node path in the network. Each node along the path transmits the test packet and awaits an acknowledgment from the receiving node. If no acknowledgment is received, the node reports an error along with error location information back along the node path to the test source. In this way, a fault is detected and isolated during a test mode of operation. Using this scheme, faults are detected and localized only during a test operating mode and requires the use of a dedicated test packet. This conventional fault detection scheme has the added disadvantage that in some cases, many test packets are required to test the entire network.

Thus, there is a need for a method and apparatus for efficiently detecting and localizing faults in a packet switched network that does not require the generation of dedicated test packets during a test mode and which detects faults even when data packets are not being sent.

SUMMARY OF THE INVENTION

In accordance with the present invention, there is provided an apparatus and a method for efficiently detecting and localizing faults in a packet switched network which uses a status message-based link control protocol to control data flow. In accordance with this protocol, status messages are sent between adjacent nodes to inform the sending node of buffer availability in the receiving node. In accordance with the present invention, an error code is generated for each status message. Specifically, a first node generates a status message and a corresponding error code. Preferably, the error code is a one bit parity check code and thus is an inverted (complemented) version of the status message. The status message is sent from the first node to a second, adjacent node using a link. The error check code is also sent from the first node to the second node using the same link which was used to send the status message. Preferably, the status message and the error code each have a bit width equal to the bit width of the data link. At the second node, a fault detector compares the status message and the error check code to determine whether an interconnect fault has occurred. Preferably the comparison is a one bit parity check of each bit of the received status message using the error code as a parity check code. In one embodiment, the parity is checked using a logic network including a plurality of "exclusive OR" gates and an "AND" gate tree.

Preferably, if a fault is detected, a counter is incremented in an error monitor located in the network node. The error monitor stores the fault information and can be accessed by a processing node.

DESCRIPTION OF THE PREFERRED EMBODIMENT

Figure 1:
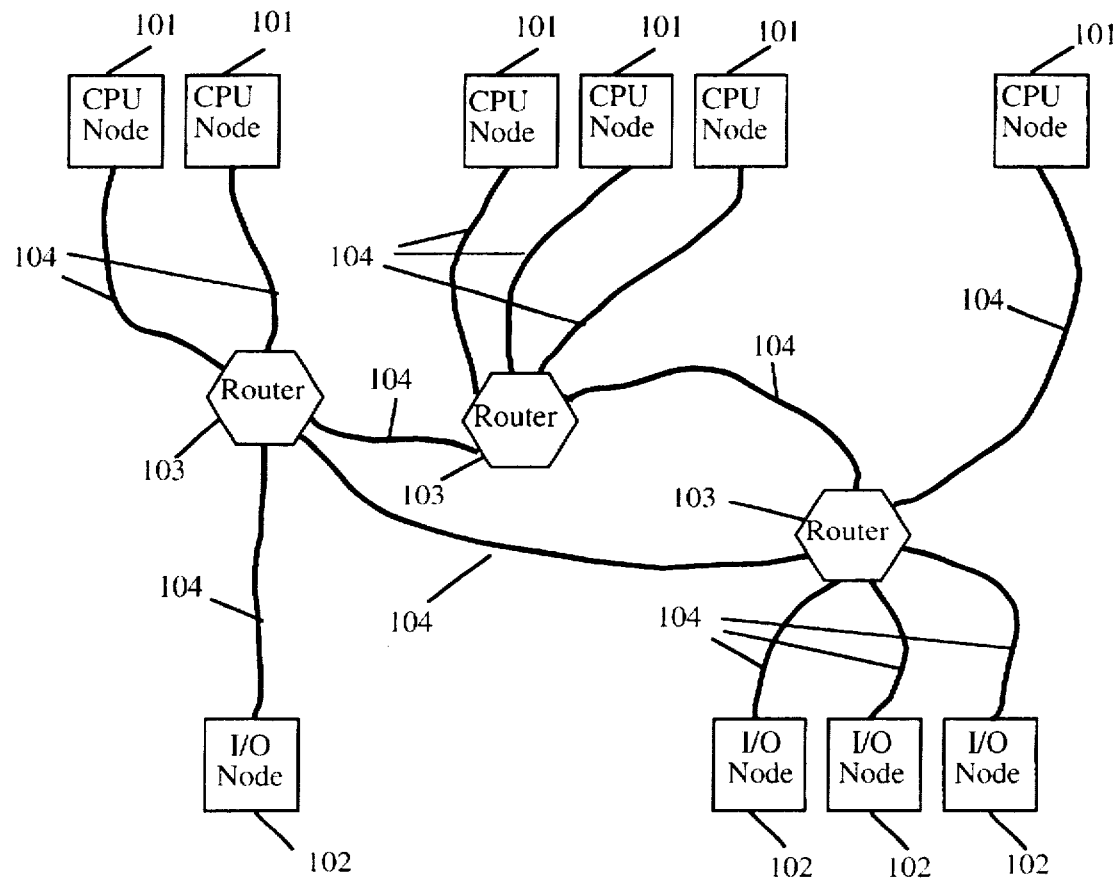
FIG. 1 is a diagram illustrating a packet switched network in accordance with the present invention.

FIG. 1 is a diagram illustrating a packet switched network 100 having a plurality of central processing unit (CPU) nodes 101 and input and output (I/O) nodes 102 interconnected over a mesh having a plurality of router nodes 103 interconnected by node-to-node interconnects (links) 104. In operation, data packets are sent from an originating (source) node to a destination node by switching the packet (within a data frame) through a router 103 or a series of routers 103. Each interconnect 104 is typically a cable on the order of several meters in length and has 86 wires. The 86 wires include two sets of 34 wires for data (i.e. two 34 bit wide data paths, one for each direction between two nodes), 2 wires dedicated to carrying framing and control information, 2 wires for carrying a differential clock signal and 5 wires for voltage reference signals for the data.

Although the principles of the present invention apply to packet switched networks using various routing methods, the routing method used in the illustrated embodiment is a source routing technique wherein the entire path (route through the network) of a packet is determined at the packet's source and is encoded in a data frame having a frame header. Thus, each packet is sent from the source node to the destination node along a path specified in the header of a data frame.

In accordance with the present invention, CPU nodes 101, I/O nodes 102 and router nodes 103 use a status message-based (a credit-based) flow control mechanism for its link protocol. In accordance with this protocol, data frames are transmitted between CPU nodes 101, I/O nodes 102 and router nodes 103 only when empty buffers are available at a downstream neighbor (adjacent node). A receiving (destination) router node 103 (or CPU node 101 or I/O node 102) sends a status message to a sending (source) router node 103 (or CPU node 101 or I/O node 102). The status message indicates the status (full or empty) of each of the input buffers 313 (illustrated in FIG. 3) located on the receiving node 101, 102 or 103. Because status messages are interleaved with data packets and because status messages are the default traffic on an idle interconnect 104, status messages are being sent over the interconnect 104 a high percentage of the time. Because the fault detection and localization method of the present invention uses a parity check of the status messages, the present invention advantageously collects fault information during normal network operation and during idle time. Thus, in accordance with the present invention, fault detection and localization information is accumulated without requiring the network or a portion thereof to operate in a dedicated test mode.

Figure 2:
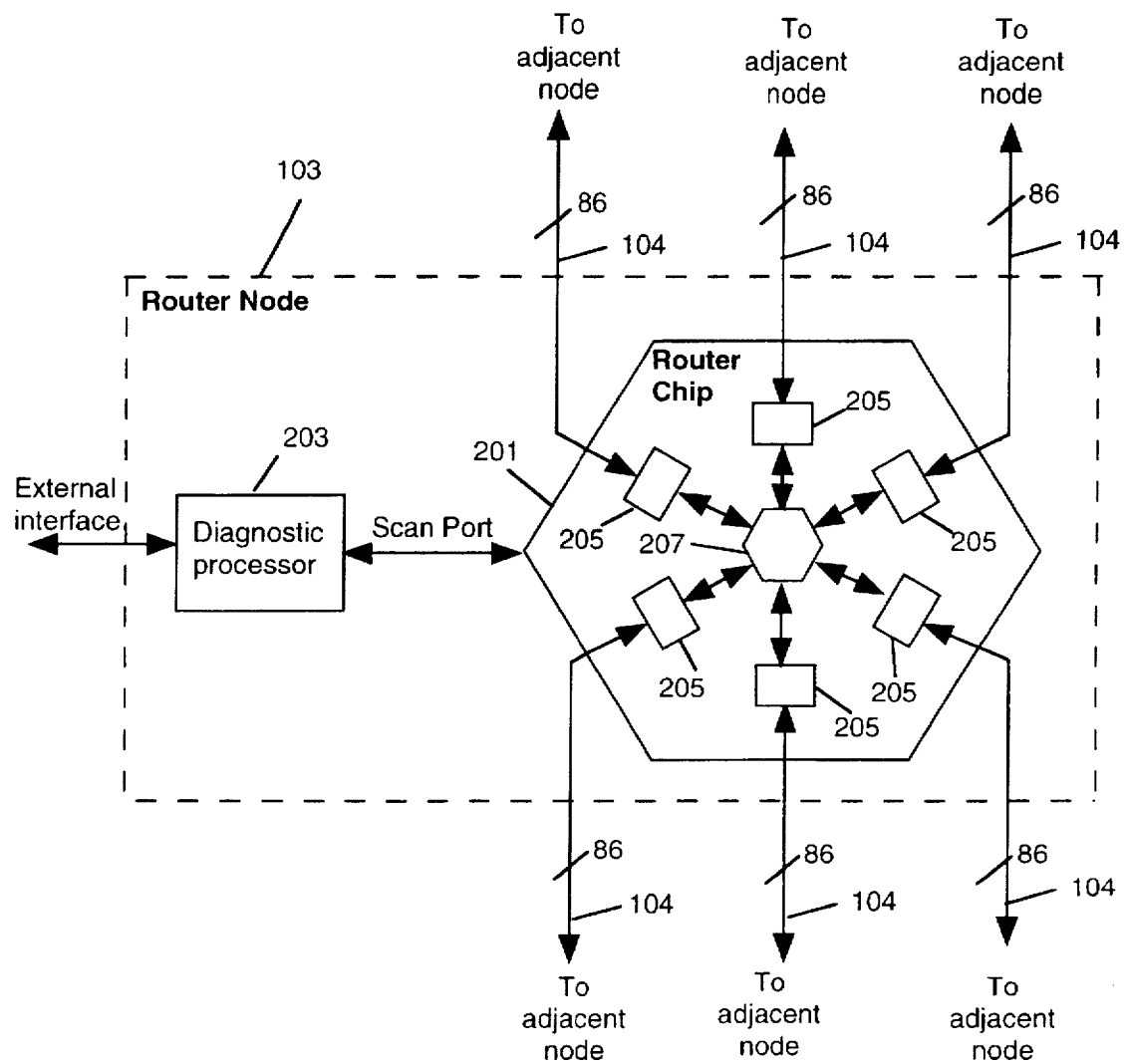
FIG. 2 is a functional block diagram of a router node in accordance with the present invention.

There is illustrated in FIG. 2 a functional block diagram of a router node 103 in accordance with the present invention. Router node 103 has a router chip 201 coupled to a diagnostic processor 203 by a scan port. Diagnostic processor 203 is also coupled to an external port. The external port may be accessed by a processing node (such as a CPU node 101) for the purposes of reading error and performance information. The external port coupled to diagnostic processor 203 is a standard interface port such as a RS232C serial port or a modified version of such an interface port.

Router chip 201 has six bi-directional ports 205 for coupling to six interconnects 104 in the packet switched network 100. Router chip 201 additionally has a crossbar switch 207 coupled to each port 205.

Figure 3:
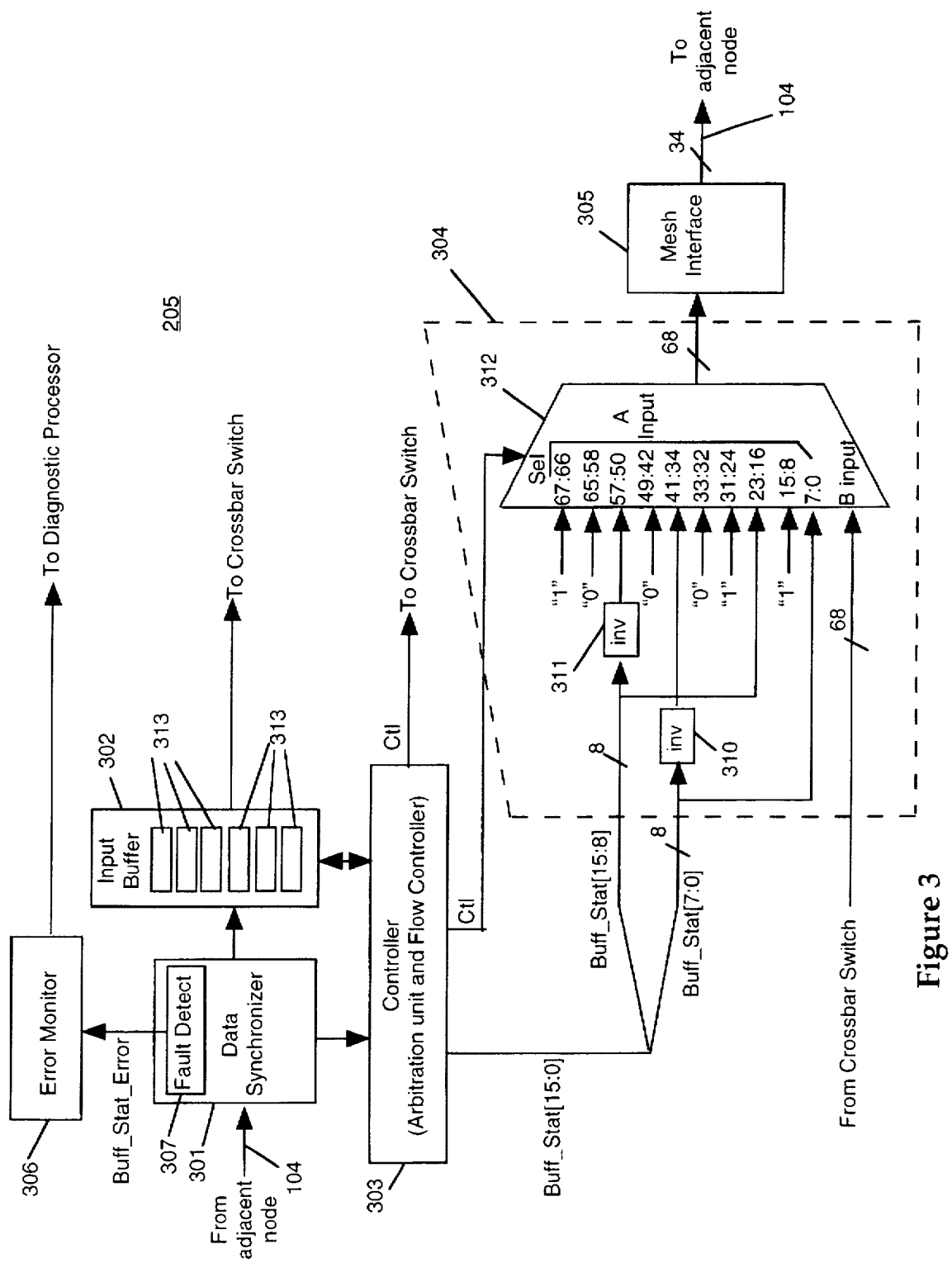
FIG. 3 is a functional block diagram of a port on a router chip in accordance with the present invention.

Ports 205 each couple crossbar switch 207 to an interconnect 104 and each perform both sending and receiving functions. Each port 205 receives data packets (in a data frame) from an adjacent node and routes the frame through crossbar switch 207 to a selected port 205 for sending (coupling) to a next node. FIG. 3 is a functional block diagram of a port 205. Port 205 has a data synchronizer 301, input buffer unit 302, controller 303, output selector/error code generator 304, mesh interface 305 and error monitor 306.

Data Synchronizer 301 is coupled to interconnect 104 and receives words (34 bits in width) from an adjacent node. The received words are either portions of a data frame or a status message. Data synchronizer 301 performs clock synchronization on data frames and determines whether a received word is a portion of a data frame or a status message. If data synchronizer 301 determines that the received word is a portion of a data frame, data synchronizer 301 couples the received word to input buffer unit 302. If, however, data synchronizer 301 determines that the received word is a status message, then the received word is coupled to controller 303 and to fault detector 307 (located in data synchronizer 301).

Input buffer unit 302 has data paths coupled to data synchronizer 301 and to crossbar switch 207 and receives control signals from controller 303. Input buffer unit 302 receives and stores a plurality of data frames. Because input buffer unit 302 has six buffers 313, each large enough to store an entire data frame, input buffer unit 302 has capacity to store up to six data frames during periods of output port contention.

As discussed, port 205 also includes controller 303 that is coupled to data synchronizer 301, input buffer unit 302 and output selector/error code generator 304. Preferably, controller 303 has an arbitration unit for assigning a priority to data frames in the input buffer unit 302. Controller 303 also generates control signals coupled to input buffer unit 302 and selector 304 for selecting the coupling of either status messages or data frames to the interconnect 104.

Selector 304 receives control signals and an intermediate status word (described below in reference to FIG. 4A) from controller 303, and responsive to the received control signals generates at its output either (i) a status message having an error check portion or (i) a frame received from crossbar switch 207. The output selector 304 is coupled to mesh interface 305.

Figure 4A:
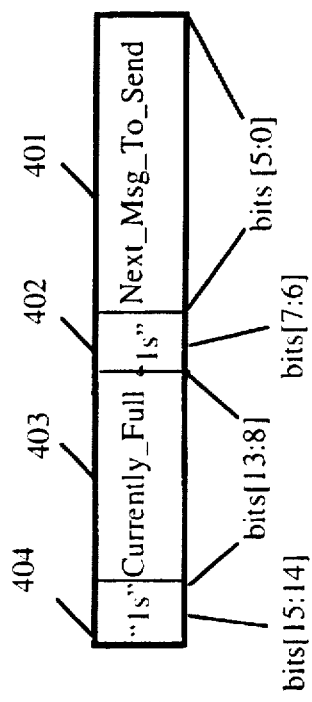
FIG. 4A illustrates the bit arrangement of an intermediate status word in accordance with the present invention.

The intermediate status word (Buff_stat[15:0]) generated by controller 303 includes buffer status information indicating which, if any, of the six input buffers 313 of input buffer unit 302 are currently full (not available) and which have been used since the last status message was sent to an adjacent node. FIG. 4A illustrates the bit arrangement of an intermediate status word in accordance with the present invention. Intermediate status word 400 is a 16 bit word. Bits 0 through 5 are Next_Msg_To_Send bits 401, bits 6 and 7 are reserved bits 402 (set to a digital "1" in the illustrated embodiment), bits 8 through 13 are Currently_Full bits 403 and bits 14 and 15 are reserved bits 404 (set to a digital "1" in the illustrated embodiment). Next_Msg_to_Send bits 401 are each associated with one of the six input buffers 313 (located in input buffer unit 302) and are set to a "1" if the associated input buffer 313 has received an input frame since the last status message was sent to an adjacent node. Thus, Next_Msg_To_Send bits 401 each contain cumulative information regarding the status of the input buffers 313 between the sending of each status message. Reserved bits 402 are reserved for configurations having up to 8 input buffers instead of the six buffers implemented in the illustrated embodiment. Currently_Full bits 403 are each associated with one of the six input buffers 313 and are set to a "1" if the corresponding input buffer is currently full and thus not available. Reserved bits 404 are reserved for configurations having up to 8 input buffers instead of the six buffers implemented in the illustrated embodiment.

Referring again to FIG. 3, selector 304 has inverter banks 310, 311 and multiplexer 312. Multiplexer 312 has a first and second input, each input having a width of 68 bits, single 68 bit wide output and a select control signal for selecting either the first or the second inputs. The first multiplexer input has a lower portion comprising 34 bits and an upper portion comprising 34 bits. Inverter banks 310, 311 are each coupled to a portion of the intermediate status word. Preferably, inverter bank 310 is coupled to the lower 8 bits containing the Next_Msg_To_Send bits 401 and inverter 311 is coupled to the Currently_Full bits 403. Inverter banks 310, 311 invert each bit of the intermediate status word to generate a one bit parity check code corresponding to the intermediate status word 400. The outputs of inverter banks 310, 311 are coupled to the upper portion of the first multiplexer input. The intermediate status word 400 is coupled to the lower portion of the first input of multiplexer 312. The additional input bits (15–8, 33–24) associated with the lower portion of the first multiplexer input are coupled to either a "high" (digital "1") voltage source or a ground (digital "0") to indicate full buffers, router version information, status information or other system information as desired. The corresponding additional input bits (49–42, 67–58) associated with the upper portion of the first multiplexer bits are selected to form a one bit parity check code with the lower portion. Thus, when the first multiplexer input is selected, multiplexer 312 generates a status message including status information and a corresponding 1 bit parity check code.

Figure 4B:
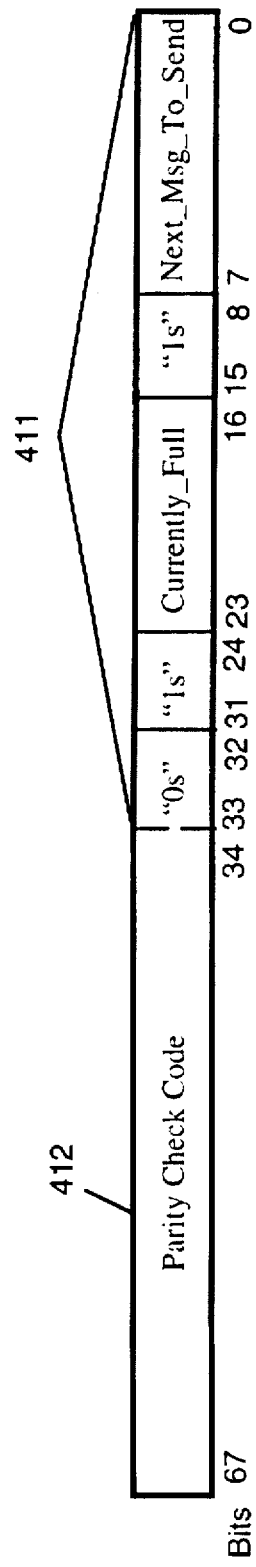
FIG. 4B illustrates the bit arrangement of a status message including its parity check code in accordance with the present invention.

FIG. 4B illustrates the 68 bit status message generated by selector 304. Status message 410 is 68 bits wide and has a status information in the lower 34 bits 411 and a parity check code in the upper 34 bits 412. Thus, upper bits 412 (bits 67–34) are inverted (complemented) versions of the lower 34 bits (bits 33–0) of the status message.

Selector 304 operates in a status mode or a data flow mode, as selected by controller 303. When controller 303 selects data flow mode, selector 304 couples data received from crossbar switch 207 to the mesh interface 305. If, however, controller 303 selects status mode, then selector 304 generates a status message including a parity check code and couples the status message to mesh interface 305.

Mesh interface 305 couples the 68 bit wide output of multiplexer 312 to interconnect 104. Mesh interface 305 separates the status message portion of multiplexer 312 output (the lower 34 bits) from the parity check code portion of the multiplexer 312 output (the lower 34 bits) for sequential transmission using interconnect 104. Thus, mesh interface 305 receives a 68 bit wide data word and multiplexes the upper and lower portions of the 68 bit word to generate two sequential 34 bit words. Mesh interface 305 then sends the two 34 bit data words in sequence to an adjacent node using the 34 bit wide data portion of interconnect 104. This guarantees that every wire (conductor) corresponding to the transmitted data bits has a transition during the sending of one buffer status message along with its associated parity check code.

In the preferred embodiment, mesh interface 305 transfers two bits per wire per clock cycle to maximize the bandwidth of interconnect 104. This increased bandwidth utilization is achieved by multiplexing one bit of data during a first clock phase and a second bit of data during a second clock phase. Thus, although the physical link (interconnect 104) between adjacent nodes is only 34 bits in width, the effective bandwidth is 68 bits over a complete clock cycle. The principles of the present invention, however, do not require the use of interconnects having increased bandwidth utilization (using two phases of a clock) as described above. Instead, the status message and the error check code can be sent sequentially to the adjacent node each on the same phase of a clock on sequential clock cycles or by using any other clocking scheme to transfer both the status message and the error check code over the same physical link at different times.

Figure 5:
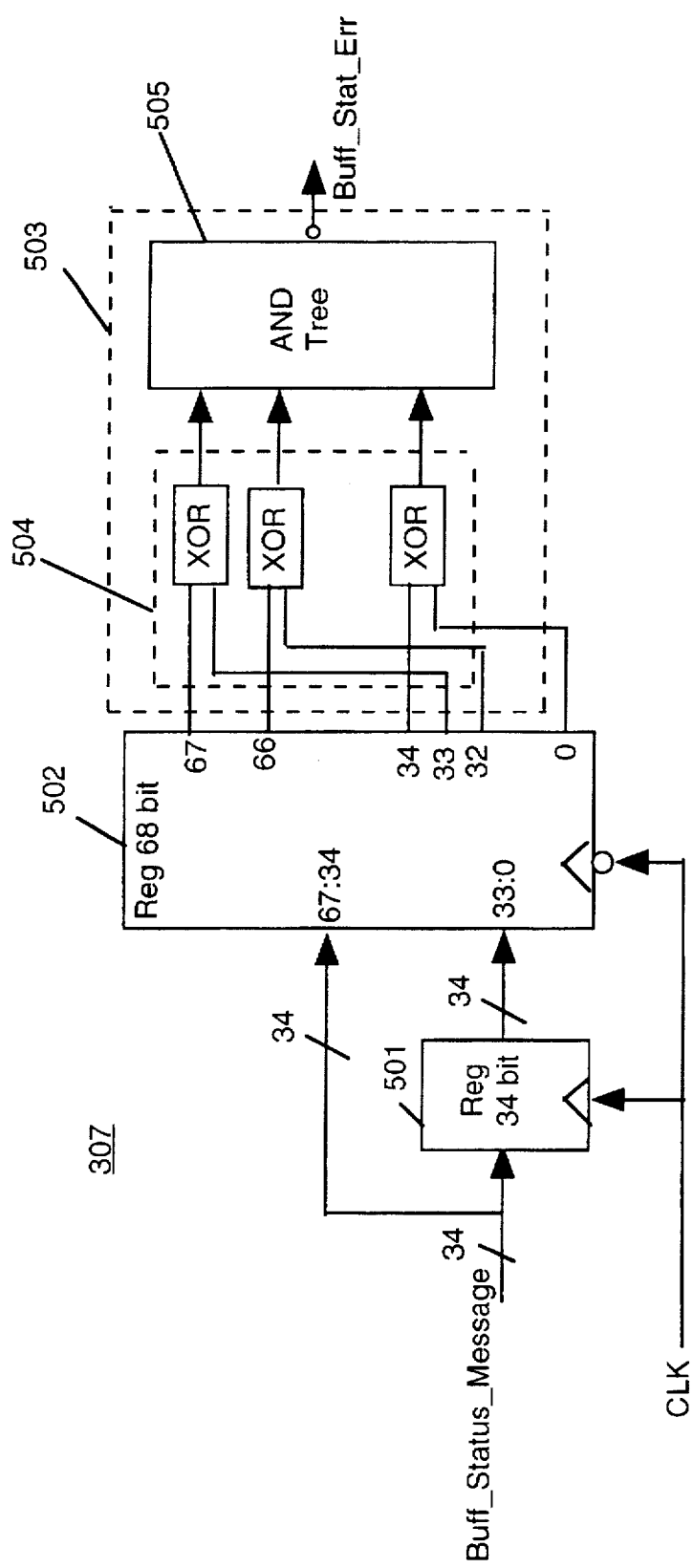
FIG. 5 is a schematic diagram of a fault detector circuit in accordance with the present invention.

Referring now again to FIG. 3, port 205 has a fault detector 307 (located in data synchronizer 301) for detecting and reporting interconnect faults to error monitor 306. FIG. 5 is a schematic diagram of fault detector 307 in accordance with the present invention. Fault detector 307 has a 34 bit wide rising-edge-triggered register 501 coupled to a 68 bit falling-edge-triggered register 502. Because register 501 is rising-edge-triggered and register 502 is falling-edge-triggered, register 502 latches the 68 bits comprising the status message and error check code over a single clock cycle using opposite clock phases. Thus, register 502 latches the status message in the lower 34 bits and the error code (one bit parity check code) in the upper 34 bits. Fault detector 307 also has logic network 503 coupled to register 502 for performing a bitwise parity check of the status message. In the illustrated embodiment, logic network 503 includes an "exclusive-OR" logic network 504 coupled serially to an "AND tree" 505 having an inverted output. In this embodiment, logic network 503 generates a fault status signal (Buff_Stat_Err) indicting whether a fault has been detected (whether a parity error has occurred on any of the status message bits). In an alternative embodiment, the outputs of "exclusive_OR" logic network 504 are additionally coupled to a register (not shown) or other storage device for storing the fault information associated with each bit of the data link on interconnect 104. With this configuration, the detected faults are isolated down to the specific bit fault.

By sending the status message during a first clock phase and the corresponding one bit parity check code during a second clock phase over the same physical link (over the same 34 wires) fault detector 307 is able to identify and isolate both "stuck at" and "open" errors which may be present on interconnect 104. It should be understood that the fault detection and localization scheme of the present invention can isolate faults occurring in non-physical links as well, for example in networks using radio links or any other non-wired link.

Referring now again to FIG. 3, port 205 also includes an error monitor unit 306. Error monitor unit 306 is coupled to fault detector 307 and collects error data for retrieval and processing by diagnostic processor 203. Error monitor unit 306 has a counter which is incremented each time a fault is detected by fault detector 307 to keep a running count of faults detected on a given interconnect 104. The running count is stored in an error register for access by diagnostic processor 203.

Preferably, the counter value is read (and then cleared) periodically by the diagnostic processor 203 which accumulates the counter values retrieved from error monitor unit 306. In one embodiment, diagnostic processor 203 performs a threshold analysis to identify faults detected as a result of transient network conditions or "glitches" and accumulates this information. Alternatively or in addition, a diagnostic program run from a CPU node 101 could perform thresholding analysis.

In one embodiment, the counter in error monitor unit 306 is a 10 bit counter that holds the maximum count value (for example, all "1s") once the maximum is reached. Thus, in the event that a link produces a particularly high fault rate, the counter will not "wrap around" and start counting from zero but instead will maintain the maximum state signaling an error (fault) rate in excess of the counter maximum.

Because the fault detection method and apparatus of the present invention is dedicated to a specific set of interconnect 104 wires at a specific node, the error monitor unit 306 advantageously provides localized fault detection information for a diagnostic program or other type of network monitoring program accessing the fault data accumulated in the error monitor unit 306 and diagnostic processor 203. Thus, such diagnostic and network programs can reconfigure the network or update the routing tables to avoid using an interconnect 104 having a high fault rate. Additionally, because the fault detection and localization method is based on the status messages used by the link control protocol, the faults are detected and localized without requiring the use of test packets or a test operating mode or even the transmission of data packets.

Thus, the method and apparatus of the present invention provides efficient fault detection and localization in a packet switched network which uses a status message-based link flow control protocol.

What is claimed is:

1. A method of detecting a fault in a packet switched network having a plurality of nodes disposed to switch data packets responsive to status messages transferred between the plurality of nodes, comprising:

generating a status message indicative of the status of a buffer at a first node;

generating an error check code corresponding to the status message;

sending the status message from the first node to a second node;

sending the error check code from the first node to the second node;

detecting receipt of the status message at the second node; and responsive to detecting receipt of the status message, comparing the status message and the error check code received at the second node to detect a fault.

2. The method of claim 1 wherein the error check code is a one bit parity check code.

3. The method of claim 2 wherein generating an error check code corresponding to the status message comprises generating an inverted status message.

4. The method of claim 2 wherein comparing the status message and the error check code received at the node to detect a fault comprises:

performing a 1 bit parity on a plurality of bits of the status message using the error code;

setting a fault status to a first state if any parity check dertermines an even parity; and setting a fault status to a second state if each parity check determines an odd parity.

5. The method of claim 1 wherein the first node and the second node are adjacent nodes.

6. A method for updating fault information in a node link in a packet switched network, comprising:

storing fault information at a node;

receiving at the node over a node link a status message as a digital word indicative of the status of a buffer;

determining whether the received digital word is a status message;

responsive to determining that the received digital word is a status message, comparing the status message to an error check code to detect a fault; and updating the fault information responsive to detecting a fault.

7. The method of claim 6 wherein the error check code is a one bit parity check code.

8. The method of claim 6 wherein comparing the status message and the error check code to detect a fault comprises:

performing a 1 bit parity check on a plurality of bits of the status message using the error check code;

setting a fault status to a first state if any parity check determines an even parity; and setting a fault status to a second state if each parity check determines an odd parity.

9. A fault detection apparatus for isolating a fault in a packet switched network having a plurality of nodes for sending and receiving data packets and status messages, comprising:

a link interface for receiving input including data packets and status messages indicative of the status of a buffer;

a status message detector coupled to the link interface for detecting whether received input is a status message and a fault detector coupled to the link interface for performing fault detection on a status message in response to detection of a status message by the status message detector.

10. The apparatus of claim 9 wherein the fault detector includes a one bit parity checker.

* * * * *